United States Patent [19]

Band

[11] Patent Number: 4,506,029
[45] Date of Patent: Mar. 19, 1985

[54] SUPPORTED CATALYST FOR POLYMERIZATION OF OLEFINS

[75] Inventor: Elliot I. Band, Yonkers, N.Y.

[73] Assignee: Stauffer Chemical Company, Westport, Conn.

[21] Appl. No.: 451,629

[22] Filed: Dec. 20, 1982

[51] Int. Cl.$^3$ ............................................. C08F 4/64
[52] U.S. Cl. ................................. 502/111; 502/104; 502/113; 502/122; 502/123; 502/124; 502/125; 502/126; 502/127; 526/114; 526/125
[58] Field of Search ............... 502/104, 111, 127, 113, 502/123, 122, 126, 124, 125

[56] References Cited

U.S. PATENT DOCUMENTS

| | | | |
|---|---|---|---|
| 3,135,809 | 6/1964 | Bosmajian | 502/103 X |
| 3,901,863 | 8/1975 | Berger et al. | 502/113 X |
| 4,226,741 | 10/1980 | Luciani et al. | 502/127 X |
| 4,294,721 | 10/1981 | Cecchin et al. | 502/127 |
| 4,328,328 | 5/1982 | Minami et al. | 502/125 X |
| 4,330,649 | 5/1982 | Kioka et al. | 502/154 |
| 4,363,746 | 12/1982 | Capshew | 502/154 |

*Primary Examiner*—Patrick Garvin
*Attorney, Agent, or Firm*—Vivienne T. White

[57] ABSTRACT

A catalytic component for polymerizing olefins comprises a solid support containing magnesium-halogen or manganese-halogen bonds, a transition metal halide of a metal selected from Groups IVB and VB of the periodic table, and electron donors. This catalytic component is obtainable by steps comprising:

(a) contacting a mixture comprising a magnesium halide or manganese halide and at least one electron donor with a Ti(OR)$_4$ compound to form a solution, where R is a hydrocarbyl or halogenated hydrocarbyl moiety containing 1 to 20 carbon atoms or a halogen, and (b) reacting the solution with a reagent comprising a transition metal halide selected from Groups IVB and VB of the periodic table, whereby, with a suitable cocatalyst, polyolefin is formed with high activity, showing a high Isotactic Index, and with a narrow range of particle size distribution.

24 Claims, No Drawings

SUPPORTED CATALYST FOR POLYMERIZATION OF OLEFINS

BACKGROUND OF THE INVENTION

This invention relates to the polymerization of olefins by the coordinate complex method, often termed the Ziegler-Natta method after the names of the two workers who contributed so much to its practical development and theoretical basis. More particularly, this invention relates to novel, activated supports for the transition metal catalytic component.

About 30 years ago the original Ziegler-Natta catalysts were heterogeneous slurries formed in place when solutions of organometallic cocatalysts, preferably taken from the compounds of metals of Groups IA, IIA, and IIIA of the periodic table, were added to solutions of transitional metal catalysts, preferably taken from compounds of metals of Groups IIIB, IVB, and VB of the periodic table. These catalytic systems by today's standards did not have high activity in terms of grams polyolefins produced per gram catalyst component. Nor, when propylene or other monomers capable of giving polymers with tacticity were employed, did these early catalytic systems provide polymer with high isotactic index. Also, the particle size distribution of the polyolefin was too broad, leading to an undesirable fraction of "fines", particles less than about 100–180 $\mu$m.

More recently, high activity, high isotactic index, and enhanced particle size have been achieved by employing catalyst supports on which catalytic transition metals have been dispersed. It has been theorized that the concentration of active polymerization centers is as much as 50 percent higher on supported catalysts than unsupported catalyst systems. These developments are discussed in the Kirk-Othmer "Encyclopedia of Chemical Technology", third edition, vol. 16, pp. 453–469 in an article entitled Olefin Polymers (Polypropylene) and in Angewandt Makromolekulare Chemie, 94, 63–89 (1981). One support which has gained favor in technical circles is magnesium halide, particularly in an activated condition. The preferred method for activating catalyst support such as magnesium halide is dry milling, as disclosed in British Pat. No. 1,335,887.

Dry milling suffers from many practical defects. Among these are long milling regimes, losses of support by "hold-up" in the milling equipment, excessive handling, the cost of milling energy, and a wide dispersion of the particle size of the milled products leading to excessively broad particle size distribution of the polyolefin. It would be advantageous to have the high catalytic activity of a supported catalyst, the high isotacticity of polymers capable of such (e.g., polypropylene) and a decreased proportion of "fines" without the necessity of a milling or grinding step. This is achieved by use of the present invention.

In European patent application 18,738, Example 4 discloses a process for preparing a titanium catalyst wherein magnesium chloride (MgCl$_2$), decane, and 2-ethylhexanol were heated at 130° C. for two hours to form "a uniform solution". Then ethyl benzoate was added, the solution added to neat titanium tetrachloride (TiCl$_4$) at 0° C., the mixture heated, and more ethyl benzoate added at 80° C. The solid which formed upon two hours heating at 80° C. was collected by filtration, and treated in TiCl$_4$ at 90° C. for another two hours.

Japanese patent application No. 80/135,103 (C.A. 94: 84852f) discloses a process for preparing a titanium catalyst wherein MgCl$_2$ dispersed in a hydrocarbon containing an alcohol and a siloxane are heated above the melting point of MgCl$_2$ (sic), actually the complex of MgCl$_2$ with the alcohol, and quenched at about $-10°$ C. to form a solid. This solid is then treated at 0° C. with ethyl benzoate and TiCl$_4$, separately, treated twice at 100° C. with TiCl$_4$, separated, washed, and dried.

U.S. Pat. No. 4,294,721 discloses a process wherein a magnesium dihalide is treated with one active-hydrogen electron donor (e.g., an alcohol) and a non-active-hydrogen electron donor (e.g., an ester), dried to a solid, treated with TiCl$_4$, and dried to form a catalyst component.

U.S. Pat. No. 4,328,328 describes a polymerization process wherein without a support three, soluble, liquid streams are introduced into a polymerization reactor to form a catalytic system in situ. The three, liquid components are a liquid MgCl$_2$.ROH complex, a liquid transition metal compound (e.g., titanium tetrabutoxide), and a liquid organoaluminum compound.

U.S. Pat. No. 4,083,802 discloses a process for preparing a supported polymerization catalyst wherein magnesium halide is caused to react with silicon tetrachloride in the presence of an alcohol or phenol to form the support. The carrier supports a titanium or vanadium catalyst.

U.S. Pat. No. 4,330,649 discloses polymerization of olefin utilizing a supported titanium catalyst prepared by dissolving magnesium dihalide in an alcohol and a hydrocarbon, adding it to a liquid titanium compound and an electron donor having no active hydrogen atoms, heating to form a solid, and retreatment of the solid with the electron donor and titanium compound again.

OBJECTS OF THE INVENTION

It is an object of this invention to prepare a supported, active catalytic component for polymerizing olefins, alone or in mixtures, to polymers of high stereoregularity without employing a milling or grinding step.

Further, it is an object of this invention to prepare a catalytic component which when employed yields polyolefin with a more narrow, and higher distribution of particle size diameter, so that there is a minimal component of "fines" in the polymer.

Other objects of the invention will be apparent to those skilled in the art of polymerization.

SUMMARY OF THE INVENTION

Surprisingly, it has been found that an active, stereospecific, supported catalytic component for coordinate complex (Ziegler-Natta) polymerization of olefins, such as propylene, to give polyolefin with a more narrow and higher particle size distribution, results from liquifying and keeping soluble a support containing magnesium-halogen and/or manganese-halogen bonds by means of a titanium alkoxide until reaction with a transition metal halide selected from Groups IVB and VB of the periodic table. The catalytic component also comprises one or more electron donors.

The novel catalytic component is obtained by steps comprising:

(a) contacting a mixture comprising a magnesium halide and/or manganese halide and at least one electron donor with a Ti(OR)$_4$ compound to form a solution, where R is a hydrocarbyl or a halogenated hydrocarbyl moiety containing 1 to 20 carbon atoms and/or a halogen, and (b) reacting the solution with a reagent comprising a transition metal halide of a metal selected from Groups IVB and VB of the periodic table.

One or more electron donors may also be incorporated in the reaction of step (b).

DETAILED DESCRIPTION OF THE INVENTION

The starting material for preparing the support for the catalyst of this invention is a magnesium and/or manganese compound containing halogen. Magnesium compounds containing halogen are preferred over their manganese analogues. The preferred starting material is anhydrous magnesium dichloride, but other material such as magnesium oxychloride, magnesium alkoxychloride, magnesium bromide, magnesium oxybromide, magnesium alkoxybromide, manganese chloride, manganese bromide, manganese oxybromide, manganese oxychloride, or manganese alkoxyhalide may be chosen. Mixtures of magnesium or manganese compounds containing halogen may be employed. These supports may contain inert diluents.

Preferably, but not necessarily, an electron donor bearing an active hydrogen atom is also comprised in the first (solubilizing) step. Among such electron donors are alcohols, phenols, carboxylic acids, amines, mercaptans, and thiophenols. The preferred electron donor with an active hydrogen atom is phenol, itself, $C_6H_5OH$.

By electron donor is meant any organic compound containing oxygen, sulfur, phosphorus or nitrogen which can donate an electron pair, that is a Lewis base.

It is advantageous to include also in the first step other electron donors not containing active hydrogen compounds. In this category may be found ethers, ketones, lactones, aldehydes, carboxylic esters, sulfonic esters, nitriles, silicones and polysiloxanes.

Specific examples of electron donors bearing an active hydrogen atom from some of the pertinent classes listed above are: veratrol, the cresols, salicylic acid, benzoic acid, tetramethylene diamine, and thiophenol. Phenols are preferred.

Specific examples of electron donors which do not have active hydrogen atoms from the pertinent classes listed above are: ethyl benzoate, ethyl anisate, ethyl toluate, ethyl acetate, butyl acetate, dibutyl ether, diethyl carbonate, γ-butyrolactone, acetone, acetophenone, nitrobenzene, dimethylacetamide, methyl carbamate, toluene diisocyanate, benzonitrile, polydimethylsiloxane (silicone oil), and N-methylpyrrolidone. Aromatic carboxylic esters, such as ethyl benzoate, are preferred. Also preferred are polysiloxanes (silicone oils).

A diluent/thinner also may be present during step (a) to lower the viscosity of the solubilizing mixture. Aromatic or aliphatic hydrocarbons such as toluene or heptane are preferred diluent/thinners, but care must be taken to use only so much as to lower the viscosity of the mixture without insolubilizing any of it. Of course, the diluent chosen must have no significant effect on the catalyst, if trace amounts remain in the catalytic component.

It is advantageous to bring the mixture of magnesium and/or manganese halide support, any electron donors present, and diluent to an elevated temperature before adding the solubilizing reagent. Heating serves to incorporate the electron donors into the support and also prepares the support for solubilization. Formation of the support/electron donors/diluent mixture may be carried out at any temperature from about 15° C. to about 180° C. A mixing temperature from about 100° C. to about 150° C. is preferred. It is advantageous to prepare the mixture under an inert gas such as nitrogen, argon, or helium.

Preferably the titanium solubilizing compound is added slowly at an elevated temperature to the support/electron donor/diluent mixture, but the order of addition could be reversed. A temperature of from about 100° C. to about 150° C. is preferred.

Formation of the initial support/electron donor/diluent mixture and the heating of the solubilizing composition resulting from the addition of the titanium compound can each be carried out from about ten minutes to about four hours in time. About one hour of heating for each procedure is preferred. After the magnesium halide and/or manganese halide support compound has been solubilized and the solution well mixed, it can be slowly cooled to ambient temperature to avoid side reactions in the initial phase of step (b).

The titanium solubilizing compound is chosen on two bases: (1) that it dissolve the magnesium halide and/or or manganese halide, and (2) that it have a benign influence on the final catalyst component. The titanium compound should be a liquid, preferably at room temperature, and certainly at the mixing and solubilizing temperature of step (a).

Tetralkyl titanates are the preferred solubilizing compounds, that is $Ti(OR)_4$ where R is an alkyl group containing 1 to 20 carbon atoms. Other alternatives for one or more of the R groups are haloalkyl, cycloalkyls, halocycloalkyls, aryls, haloaryls, or halogens, themselves. The R group need not be the same, that is a symmetrical titanium compound is not necessary. The R moiety may be a hydrocarbyl or halogenated hydrocarbyl containing from 1 to 20 carbon atoms, or a halogen atom. Titanium tetrabutoxide is the preferred solubilizing titanium compound.

The ratio of any one or all of the electron donors to the support compound can vary from about 1 to 10 to 10 to 1. An initial charge of electron donors equal in weight to the support compound is preferred.

The amount of diluent/thinner to support compound can vary from about 1 to 1 to about 25 to 1. A ratio of about ten times the weight of the support compound for the diluent/thinner is preferred. The amount of solubilizing titanium compound can vary from about 3 to 1 to about 20 to 1. A ratio of about 4 to 1 for the solubilizing compound to the support is preferred.

The next step (b) in the process of producing the novel catalytic component of the present invention is reacting the solution from step (a) with a reagent comprising a transition metal halide of a metal selected from Groups IVB and VB of the periodic table. Optionally, one or more electron donors of either the active hydrogen type or the non-active hydrogen type may be present in the reagent. The transition halide reagent may be employed neat, if it is a fluid, or may be dissolved in an inert solvent such as a hydrocarbon. Titanium is the preferred transition metal, and titanium tetrahalide, neat or in solution, the preferred halide. Examples of inert solvents are heptane, toluene, chlorobenzene, and kerosene.

The preferred transition metals to be bound into the catalyst support are titanium, vanadium, and zirconium, but other metals from Groups IVB and VB of the periodic table may be employed. Any liquid or gaseous compound containing at least one transition metal-halogen bond may be used to bind the transition metal ion to the catalyst support. Chlorine is the preferred halogen, but compounds of bromine or iodine may also be used. Liquid compounds containing transition metal-halogen bonds are preferred to gases. Solid compounds may be employed, if they are soluble in inert solvents.

Examples of preferred specific titanium halide compounds which may be used are: $TiCl_4$, $TiBr_4$, $TiI_4$, $Ti(OC_3H_7)Cl_3$, $Ti(OC_6H_5)Cl_3$, $Ti(OC_4H_9)SCl_2$, $Ti[OC(CH_3)=CHCOCH_3]Cl_2$, $Ti[N(C_2H_5)_2]Cl_3$, and $Ti(C_7H_5COO)Cl_3$. Analogous halogen-metal compounds of V, Zr, and niobium may also be employed.

The amount of transition metal-halide fluid compound used ranges from about 0.1 mole to about 2 moles per mole magnesium or manganese in the support material, when the transition metal halide is dissolved in an inert solvent. When the transition metal halide is employed as a liquid, neat, or in the form of a gaseous stream then it will normally be in large stoichiometric excess.

The temperature of reaction for the solution from step (a) with the transition metal halide in step (b) ranges from about ambient temperature to about 180° C. The preferred range is from about 80° C. to about 137° C., the boiling point of $TiCl_4$ at atmospheric pressure.

The time of reaction for step (b) varies inversely with temperature from about one hour to about eight hours. From about two to about three hours reaction time is preferred.

Normally after the reaction has been completed the catalyst is filtered, washed one or more times with the solvent of the reaction, if one has been used, and then several times with a volatile solvent, such as heptane, before drying under reduced pressure. It is advantageous to wash the separated catalyst with enough solvent so that the filtrate is free of halogen before vacuum drying.

Once the catalytic support is formed and treated, it is sensitive to moisture and air. Therefore, it should be kept and handled in an inert atmosphere thereafter. Dry nitrogen or argon are examples of inert gases. Use of a gloved dry box is convenient for handling and storage of the catalytic component.

The product of the present invention will normally contain from about one percent to about ten percent by weight of transition metal.

The catalytic component of the present invention is broadly applicable to the polymerization of monomeric olefins including 1-olefins such as ethylene and propylene, dienes, especially conjugated dienes such as butadiene, and those other olefins which are only polymerized with difficulty, such as 2-butene. The preferred monomeric olefins are those corresponding to the formula $R—CH=CH_2$, wherein R is an alkyl radical containing up to 12 carbon atoms inclusive and hydrogen. Among the preferred monomeric olefins are ethylene, propylene, 1-butene, 1,4-butadiene, 1-pentene, 4-methyl-1-pentene, 1-hexene, and the like. These monomers may be employed individually or in comonomeric mixtures such as ethylene/propylene, ethylene/propylene/butadiene, and the like. The term "monomeric olefin" means those olefins which can undergo addition polymerization alone or with comonomers.

Although for illustrating the present invention, the polymerization of propylene is described herein as an example, the invention is by no means limited to any one monomeric olefin.

The organometallic compound for the necessary cocatalyst, may be an organometallic compound known to those skilled in the art of coordinate complex polymerization as useful. Included are organocompounds of zinc, mercury, magnesium, cadmium, boron, gallium and other metals of Groups IA, IIA, and IIIA of the periodic table of elements. The preferred organometallic compounds are those of aluminum, especially trialkylaluminums.

The molar ratio of trialkylaluminum or other cocatalyst to the novel catalyst of the present invention may range from about 1000:1 to about 1:1, preferably about 200:1 to about 10:1.

An electron donor may be employed in the cocatalyst component with the organometallic compound. Oxygen compounds are preferred donors especially alkyl esters of aromatic carboxylic esters. Methyl toluate, ethyl anisate, ethyl benzoate, and dibutyl phthalate, are examples of such preferred electron donors (Lewis bases) for the cocatalyst component.

The electron donor employed in conjunction with the cocatalyst may be advantageously used in a molar ratio from about 1:15 to about 1:1 with respect to the cocatalyst (e.g., trialkylaluminum).

After having described the preparation of the novel polymerization catalyst of the present invention above, the following Examples illustrate but do not limit its utility. Many variations of these Examples can be carried out by those skilled in the art of coordination complex polymerization within the scope of this invention.

EXAMPLE 1

This Example illustrates preparation of the novel catalytic component of the present invention.

Into a stirred, heated 250-ml reaction flask fitted with inlet and outlet for nitrogen was added 4 g magnesium chloride, 4 g phenol, 1.5 g ethyl benzoate, 2 ml. silicone oil (General Electric Co. SF 95-100), and 50 ml dry toluene. The mixture was agitated and heated at 120° for one hour, whereupon 20 ml neat titanium tetrabutoxide was added and the heating at 120° C. under nitrogen with agitation at about 400 rpm was continued for an additional hour. A clear solution was thereby formed, which stayed in solution upon cooling to about 20° C.

Then, over a period of 20 minutes with stirring at about 120 rpm, 55 ml titanium tetrachloride is added. After about 5 ml of the neat $TiCl_4$ was added, a precipitate starts to form. After the addition of the transition metal halide, the reaction flask was heated to 105° C. and agitated intermittently for two hours.

After the reaction the solids were separated by filtration while the mother liquor was still warm, washed twice at room temperature with 100-ml portions of toluene, four times with 100-ml portions of heptane, and vacuum dried. The yield was 4.74 g of the orange-yellow catalytic component of the present invention.

EXAMPLE 2

This Example illustrates the use of the catalytic component of the present invention to polymerize propylene by the slurry method.

The novel component containing titanium is air and moisture sensitive. Thus during preparation, storage, and use it should be kept in an inert atmosphere (e.g., nitrogen, argon) containing less than 5 ppm oxygen and less than 5 ppm moisture. The preferred cocatalysts methyl toluate or ethyl anisate are hydroscopic and should also be handled in a moisture-free environment. All reagents should be of polymerization grade.

Into a 4.5-L. stirred reactor equipped with a heater, means for temperature control, gas inlet and outlet lines are added in order 2 L. heptane, 12 mmole triethylaluminum, 0.54 g (3 mmol) of methyl p-toluate, 30 mg of the novel catalyst prepared in Example 1, and 3.2 psi (1/5 atmosphere) of hydrogen as a polymerization moderator. The reactor is stirred at 600 rpm and held at 65° C. Then the polymer-grade propylene is introduced and maintained at 10 atmospheres for 1.5 hours, whereupon this polymerization is stopped by venting the gases and pouring the contents of the reactor into alcohol. Filtering and vacuum-drying steps are carried out in the usual manner.

Catalytic activity is defined as the grams of total polymer produced both soluble and insoluble in the polymerization medium per grams of catalytic component. For the catalytic component of Example 1 the activity was 4783 g PP per gram catalyst.

Isotactic Index (II) is defined as the weight percent of the total polymer produced which is insoluble in refluxing heptane after three hours. For the polymer made by the catalyst of Example 1 the II was 87.4 percent.

EXAMPLE 3

This Example illustrates an intensification of step (b), by repetition, in the process of preparing the catalytic component of the present invention.

A 4-g aliquot of the catalytic component of Example 1 was re-reacted with 13.5 ml of neat $TiCl_4$ at 105° C. for two hours with agitation at about 120 rpm. The solid was then separated by filtration after cooling, as in Example 1, washed twice with toluene and four times with heptane, and vacuum dried to yield 3.2 g of a yellow powder.

As in Example 2, this catalytic component was characterized by slurry polymerization of propylene. This catalyst showed an activity of 5691 g PP/g catalytic component. The polypropylene produced showed an Isotactic Index of 88.8 percent.

EXAMPLE 4

This Example illustrates the narrow distribution of the particle size with a concurrent dimution of "fines" for the polyolefin produced by the catalytic component of the present invention.

A sample of the polypropylene prepared as in Example 2, employing the catalytic component of Example 1, was wet-sieved in ethanol by the procedure of ASTM STP 447A (1977) to give the distribution of particle size by weight. The results are given in the following Table:

TABLE

| Particle Size Distribution for the Present Invention | |
|---|---|
| Size ($\mu$m) | Percent (wgt.) |
| <45 | 0.7 |
| 45–75 | 0.7 |
| 75–180 | 2.7 |
| 180–425 | 6.9 |
| 425–850 | 19.3 |
| 850 $\mu$m–1.7 mm | 32.9 |
| >1.7 mm | 36.8 |

One notes that the total weight percent of particles below 180 m is only 4.1.

COMPARATIVE EXAMPLE 1

This Comparative Example illustrates the effect of omitting the critical aspect of the present invention, namely the solution of the support halide by the titanium compound.

The procedure of Example 1 was followed except that the use of titanium tetrabutoxide to form a solution was omitted.

By the procedure of Example 2 a polymerization of propylene was carried out by the control catalytic component, which had not been dissolved in the presence of electron donors and then precipitated by reaction with a transition metal halide. The activity of the control catalyst was only 836 g PP/g. catalyst. The polypropylene formed had an isotactic index of 87.1 percent.

COMPARATIVE EXAMPLE 2

This Comparative Example illustrates the effect of intensifying by repetition the reaction of transition metal halide within a substrate not benefitting from the critical step of the present invention, namely solution in a titanate in the presence of electron donors.

The catalyst prepared in Comparative Example 1 was re-reacted with $TiCl_4$ by the procedure of Example 4. By the procedure of Example 2 propylene was polymerized using the re-reacted product of this paragraph. The catalytic activity was only 730 g PP/g catalyst. The isotactic index of the polypropylene formed was 87.3 percent.

EXAMPLE 5

This Example illustrates that although it is necessary as part of the present invention to dissolve the magnesium halide or manganese halide with a titanate, an inert solid diluent, such as an oxide, may be present in the support which itself does not dissolve.

In a dry box under nitrogen 1.54 g ethyl benzoate, 4 g phenol, 2 ml silicone oil, and 4 g magnesium oxide were placed in 200-ml reaction flask equipped with a stirring bar. By separate syringes 50 ml toluene and 20 ml titanium tetrabutoxide were added. Then 4 g magnesium chloride added and the mixture heated to 120° C. for 2¼ hours with stirring. Apparently the $MgCl_2$ dissolved but the MgO did not.

The temperature was lowered to 105° C. and 55 ml of $TiCl_4$ was slowly introduced (over 18 minutes), dropwise. A precipitate formed. The mixture was held at 105° C. for two hours, whereupon the reaction mixture was briefly cooled, the solids separated by filtration, washed twice with 75-ml portions of toluene, four times with 50-ml portions of heptane, and vacuum dried for two hours. The yield was 19.4 g (sic) of an orange-brown solid. This catalytic component was termed 5A.

An 8-g aliquot of catalytic component 5A was further reacted with 27 ml neat $TiCl_4$ at 105° C. for two hours, as shown in Example 3 and Comparative Example 2. After five minutes of cooling a heavy sludge formed, so an additional 30 ml $TiCl_4$ was added to the warm reaction mixture to facilitate transfer and filtration. After slow separation from the mother liquor by filtration, the solid was washed four times with 75-ml portions of heptane and vacuum dried for 35 minutes. The final catalyst, termed 5B, was 7 g of a dark brown powder.

By the procedure of Example 2 sample 5B was characterized for the polymerization of propylene with the following results:

| Sample | Catalytic Activity (g PP/g cat.) | Isotactic Index (%) |
| --- | --- | --- |
| 5B | 2948 | 82.7 |

Having illustrated, but not limited, the invention by the Examples above, the scope of patent coverage sought is described in the following claims.

I claim:

1. A catalytic component for polymerizing olefins comprising a solid support comprising magnesium-halogen and/or manganese-halogen bonds, a transition metal halide of a metal selected from Groups IVB and VB of the periodic table, and electron donors obtained by steps comprising:
    (a) contacting a mixture comprising a magnesium halide and/or manganese halide and at least one electron donor with a Ti(OR)$_4$ compound to form a solution, where R is a hydrocarbyl and/or halogenated hydrocarbyl moiety containing 1–20 carbon atoms, and
    (b) reacting the solution with a reagent comprising a transition metal halide of a metal selected from Groups IVB and VB of the periodic table.
2. A catalytic component as in claim 1 wherein the transition metal is titanium.
3. A catalytic component as in claim 1 wherein one of the electron donors comprises a carboxylic ester.
4. A catalytic component as in claim 1 wherein one of the electron donors comprises a phenol.
5. A catalytic component as in claim 1 wherein one of the electron donors comprises a polysiloxane.
6. A catalytic component as in claim 1 wherein the halide is chloride.
7. A catalytic component as in claim 1 wherein the reagent of step (b) comprises an electron donor.
8. A catalytic component as in claim 1 wherein the transition metal halide is a titanium chloride.
9. A catalytic component as in claim 8 wherein the titanium chloride is titanium tetrachloride, TiCl$_4$.
10. A catalytic component as in claim 1 wherein the Ti(OR)$_4$ compound of step (a) is a titanium tetraalkoxide.
11. A catalytic component as in claim 10 wherein the titanium tetraalkoxide is titanium tetrabutoxide.
12. A catalytic component as in claim 1 wherein the solid support comprises magnesium chloride.
13. A process for preparing a catalytic component for polymerizing olefins comprising the steps of:
    (a) contacting a mixture comprising magnesium halide and/or manganese halide and at least one electron donor with a Ti(OR)$_4$ compound to form a solution, where R is a hydrocarbyl and/or halogenated hydrocarbyl moiety containing 1–20 carbon atoms, and
    (b) reacting the solution with a reagent comprising a transition metal halide of a metal selected from Groups IVB and VB of the periodic table.
14. A process as in claim 13 wherein the transition metal is titanium.
15. A process as in claim 13 wherein one of the electron donors comprises a carboxylic ester.
16. A process as in claim 13 wherein one of the electron donors comprises a phenol.
17. A process as in claim 13 wherein one of the electron donors comprises a polysiloxane.
18. A process as in claim 13 wherein the halide is chloride.
19. A process as in claim 13 wherein the reagent of step (b) comprises an electron donor.
20. A process as in claim 13 wherein the transition metal halide is a titanium chloride.
21. A process as in claim 20 wherein the titanium chloride is titanium tetrachloride.
22. A process as in claim 13 wherein the Ti(OR)$_4$ compound of step (a) is a titanium tetralkoxide.
23. A process as in claim 22 wherein the titanium tetralkoxide is titanium tetrabutoxide.
24. A process as in claim 13 wherein the solid support comprises magnesium chloride.

* * * * *